United States Patent [19]

Hwang

[11] Patent Number: 5,311,499
[45] Date of Patent: May 10, 1994

[54] METHOD AND APPARATUS FOR ERASING INFORMATION FROM OPTICAL RECORDING TAPE WITH A THERMO-DEFORMING LAYER

[75] Inventor: Weon-jae Hwang, Suwon, Rep. of Korea

[73] Assignee: SamSung Electronics Co., Ltd., Suwon, Rep. of Korea

[21] Appl. No.: 794,236

[22] Filed: Nov. 19, 1991

[30] Foreign Application Priority Data

May 20, 1991 [KR] Rep. of Korea ............... 91-8185

[51] Int. Cl.$^5$ ............... G11B 7/24; G11B 7/00
[52] U.S. Cl. ............... 369/275.2; 369/100; 369/275.4; 369/288; 360/59; 430/270; 430/945; 430/495
[58] Field of Search ............... 369/100, 109, 275.1, 369/275.2, 288, 275.4; 360/59; 430/270, 345, 495

[56] References Cited

U.S. PATENT DOCUMENTS

| | | | |
|---|---|---|---|
| 4,404,656 | 9/1983 | Cornet | 369/100 |
| 4,852,075 | 7/1989 | Feyrer et al. | 369/100 |
| 4,855,992 | 8/1989 | Ikegawa et al. | 369/275 |
| 4,896,314 | 1/1990 | Skiens et al. | 369/100 |
| 4,918,682 | 4/1990 | Finegan | 369/100 |
| 4,961,123 | 10/1990 | Williams et al. | 369/44.11 |
| 5,079,758 | 1/1992 | Clark | 369/275.2 |

*Primary Examiner*—Paul M. Dzierzynski
*Assistant Examiner*—Kim-Kwok Chu
*Attorney, Agent, or Firm*—Robert E. Bushnell

[57] ABSTRACT

A method and apparatus for erasing information from optical recording tape having a thermo-deforming layer is disclosed in which information is recorded by forming bumps with residual stress deformed viscoelastically by way of heating portions of the thermo-deforming layer, and is erased by making the bumps planar by re-heating the bumps in order to remove the residual stress. The information is erased by forming a focal line on the optical recording tape using optical elements for emitting and condensing light of a predetermined thermal energy, and reheating the thermo-deforming layer including the bumps on the focal line. The information is effectively erased by means of an erasing optical device which forms a focal point, on the optical recording tape having the thermo-deforming layer. Thus, low power consumption is achieved by the efficient use of light during erasure.

16 Claims, 4 Drawing Sheets

METHOD AND APPARATUS FOR ERASING INFORMATION FROM OPTICAL RECORDING TAPE WITH A THERMO-DEFORMING LAYER

BACKGROUND OF THE INVENTION

The present invention relates to a method and apparatus for erasing information from optical recording tape with a thermo-deforming layer, and particularly to a method and apparatus for optically erasing information using an optical system which scans a tape with focused light.

Referring to Japanese laid-open patent publication No. 1-294238 and U.S. Pat. No. 4,398,203, an information medium is introduced in which information is optically recorded and read. Different from conventional magnetic, optical, or magneto-optical media, the information medium has a thermo-deforming layer which is viscoelastically thermo-deformed, and records information according to the arrangement of bumps created by heating portions of the thermo-deforming layer.

The basic structure and record/playback principle of the medium are illustrated in FIGS. 1A, 1B and 1C. Referring to FIG. 1A, the medium comprises a supporting layer 1, a thermo-deforming layer 2, and protective layer 3 which are stacked in order. When laser light 5 is projected on thermo-deforming layer 2, the portion which is irradiated by laser light 5 is heated by its thermal energy and expands viscoelastically as shown in FIG. 1B. Then, when cooled, the expanded portion contracts by viscoelastical deformation to render a bump 4 having a different residual stress than the original planar form as shown in FIG. 1C. Thus, it is possible to optically record information by discontinuously forming the bumps while projecting modulated laser light. In addition, when laser light is induced to the degree where the thermo-deforming layer does not yet expand from the heat, optical reproduction of the information can be done by detecting light modulated and reflected by the bumps. Further, since the thermo-deforming layer becomes planar by being heated to remove the residual stress of the bumps, erasing the information is also possible by means of a heater capable of evenly heating the entire thermo-deforming layer.

Optical recording media with such a thermo-deforming layer may be manufactured, for example, in cassette tape form, and a broad application of uses for such a thermo-deforming layer could include computer memory devices, processing of information, audio players and video players.

In FIG. 2, tape T, an optical recording medium is wound on two reels R and R' in a cassette C. A heater EH is used as an erase head and an optical means OH is used as a record/playback head. The two heads are provided in close proximity to tape T which travels between the two reels R and R', and passes near the heater EH which is in the form of a plate or a rod and installed without making direct contact with tape T. In other words, the conventional erasing method uses radiant heat from the heater EH which heats tape T as it passes, the tape then cools as it proceeds past the influence of heater EH.

Erasing by heat, however, is disadvantageous in that first, since the environment influences the heater, maintaining a proper and uniform heating temperature is difficult; second, the erasing operation is delayed because the heater requires time to rise to a predetermined temperature; and finally, while cooling, an additional heat shielding means or a cooler is required in order to interrupt the influence of radiant heat from the heater EH.

SUMMARY OF THE INVENTION

Therefore, it is an object of the present invention to provide an optical erasing method and apparatus thereof which provides an effective erasing operation by using the thermal energy of laser light, instead of erasing by heat.

To achieve the object, an optical means is employed to scan a running tape with a focused light of a predetermined thermal energy.

Therefore, in a method for erasing information on an optical recording tape having a thermo-deforming layer which records information by forming bumps with residual stress deformed viscoelastically while partly heating the layer, and erases the information by making the bumps planar by re-heating the bumps in order to remove the residual stress, an erasing method of the present invention is characterized in forming a focal line on the tape using an optical element for emitting and condensing light of a predetermined thermal energy, and re-heating the thermo-deforming layer including the bumps on the focal line.

An erasing apparatus especially adapted to carry out the erasing method of the present invention comprises at least one light source which produces light of a predetermined thermal energy, and an optical system including a lens element for condensing light generated from at least one of the light sources, creating a focal line on an optical recording tape.

According to the present invention, thermal energy of light can be effectively utilized in that light is concentrated on the focal line by means of the optical device, while the tape, to be more precise, the thermo-deforming layer, meets the focal line more exactly. Since the thermal energy of light depends on the optical system including the light source and the lens element for condensing the light, the thermal energy is not influenced by environmental factors.

Accordingly, the present invention facilitates control of the temperature required to remove the residual stress of the bumps in order to make the bumps of the thermo-deforming layer planar, without additional cooling since the peripheral temperature of the tape does not rise. Erasing the tape can thus be performed rapidly without delay for cooling.

Furthermore, to erase the information completely, during the erasing operation, the present invention enables control of the optical system for correcting an error caused by the tape's horizontal and vertical vibration so that the focal line of the optical system coincides with that of the tape.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE PREFERRED EMBODIMENTS

Figure 1A:
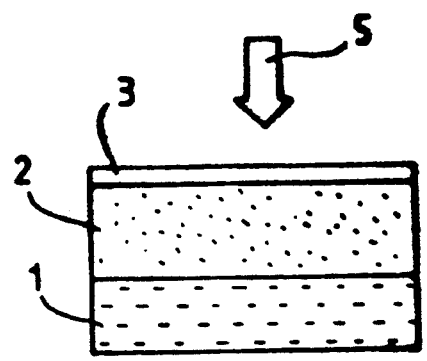
FIGS. 1A, 1B and 1C are cross sections illustrating the structure of an optical recording tape with a thermo-deforming layer and the record/playback principle thereof.
Figure 1B:
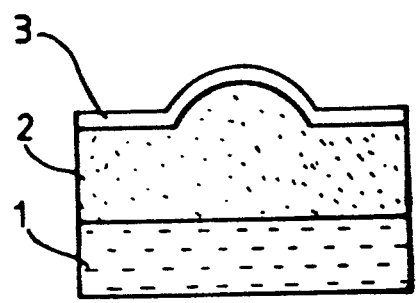
Figure 1C:
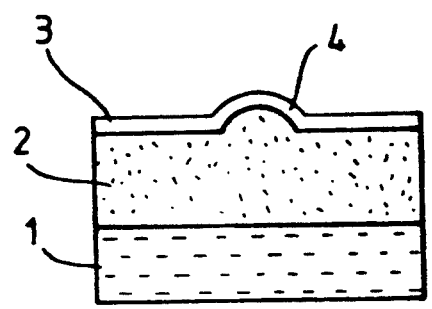
Figure 2:
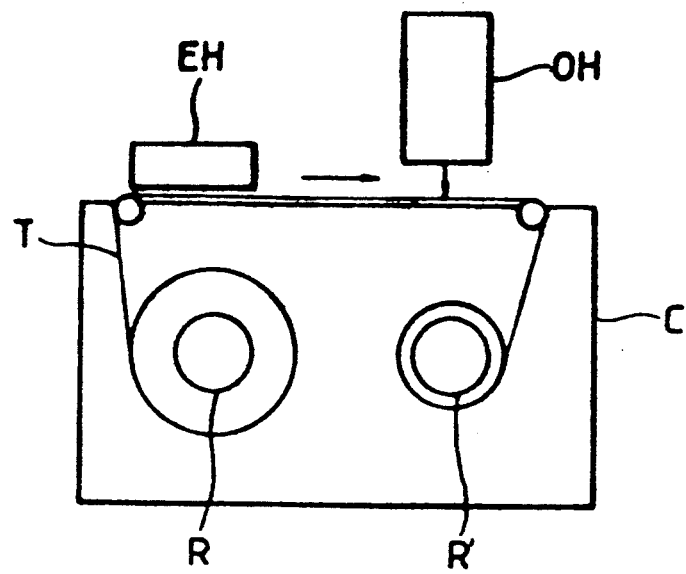
FIG. 2 is a plan view of a tape playing portion illustrating a conventional erasing device using the tape shown in FIG. 1.
Figure 3:
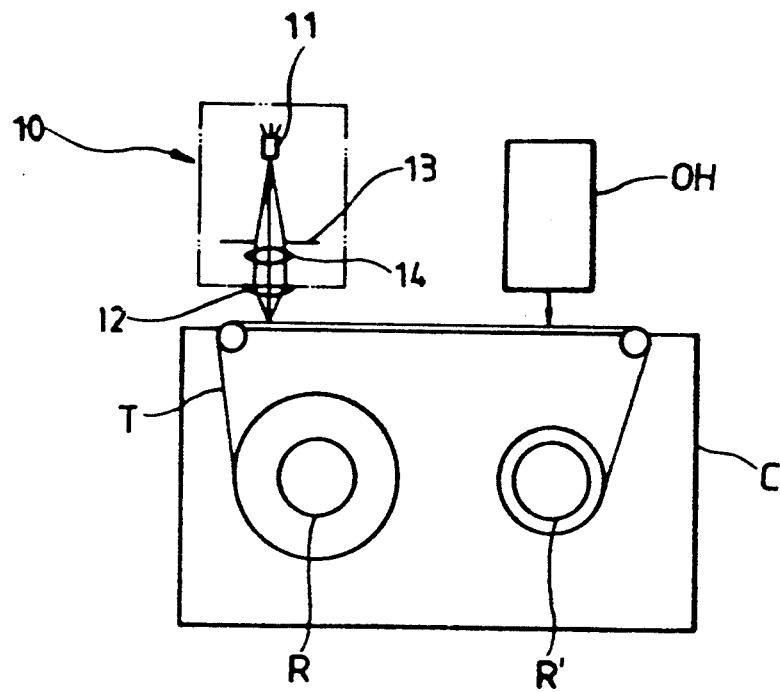
FIG. 3 is a plan view of a tape playing portion illustrating an erasing device of the present invention.

Referring to FIG. 3, the erasing device of the present invention is different from the conventional erasing device of FIG. 2 in that an erasing optical device 10 is provided as an erasing head.

Figure 4:
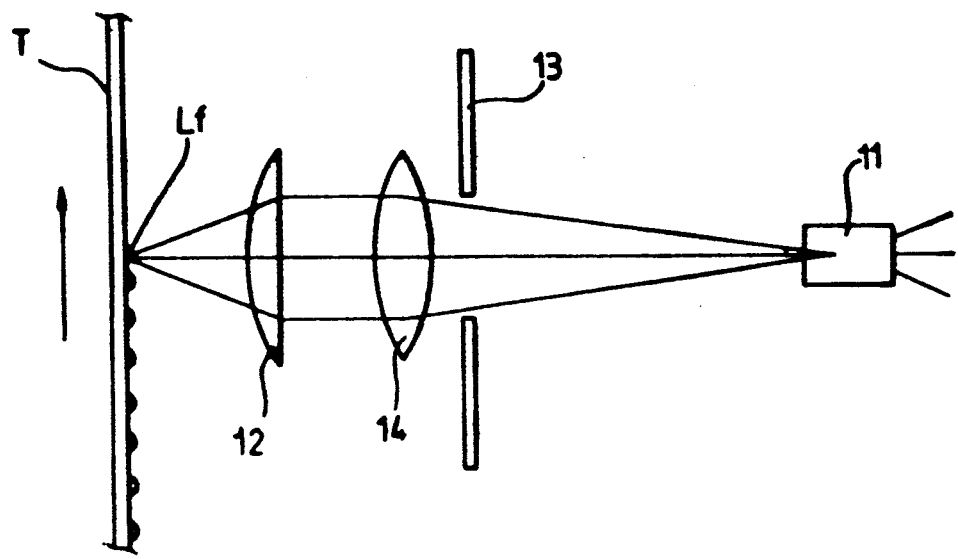
FIG. 4 is an enlarged plan view of the erasing optical device shown in FIG. 3.

The erasing optical device 10 as shown in FIG. 4, comprises a laser diode 11 for emitting laser light as a light source, a semi-cylinder lens 12 for concentrating the laser light on focal line $L_f$, a square incidence aperture 13 which is positioned between laser diode 11 and semi-cylinder lens 12 to pass only the central portion of the laser light, and a collimating lens 14 for converting the light passing through the aperture to parallel light.

The square incidence aperture 13 passes the central portion of the laser light, intercepts the low-intensity peripheral light, and simultaneously squares the cross-section of the light incident upon the collimating lens 14. When the square beam of parallel light is incident to semi-cylinder lens 12, the beam becomes horizontally concentrated, thus focusing along focal line $L_f$ vertically (see FIG. 5). Tape T runs on the plane including the focal line and is heated by the thermal energy of the focused light, erasing the tape.

Detecting and driving optical devices are provided so that tape T may precisely coincide with the focal line $L_f$. Briefly, reflected light from tape T is used to sense the focal line's exact location according to the tape's vibration. Then, using a correction signal obtained from the reflected light, either the semi-cylinder lens 12 or the entire optical device itself is driven horizontally and/or vertically. A detailed description of the optical devices will be herein abbreviated since detecting and driving devices of this nature are commonly used in the art.

Figure 5:
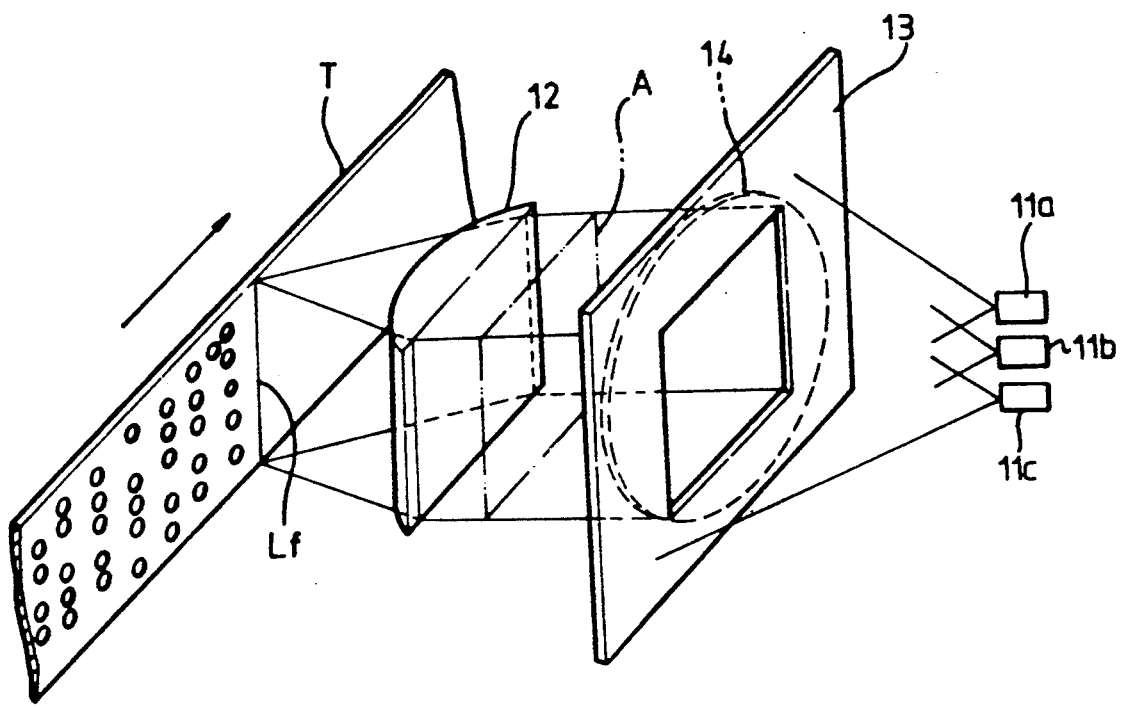
FIG. 5 is a perspective view illustrating another embodiment of the erasing optical device shown in FIG. 3.

Referring to FIG. 5, three laser diodes 11a, 11b and 11c are used as light sources in the embodiment. Laser diodes 11a, 11b and 11c are spaced apart from one another and in parallel with focal line $L_f$ formed on the tape. The purpose of this arrangement of the three diodes is to obtain high and even gain distribution of the Gaussian beam within a square region A of the parallel light incident to semi-cylinder 12.

Figure 6:
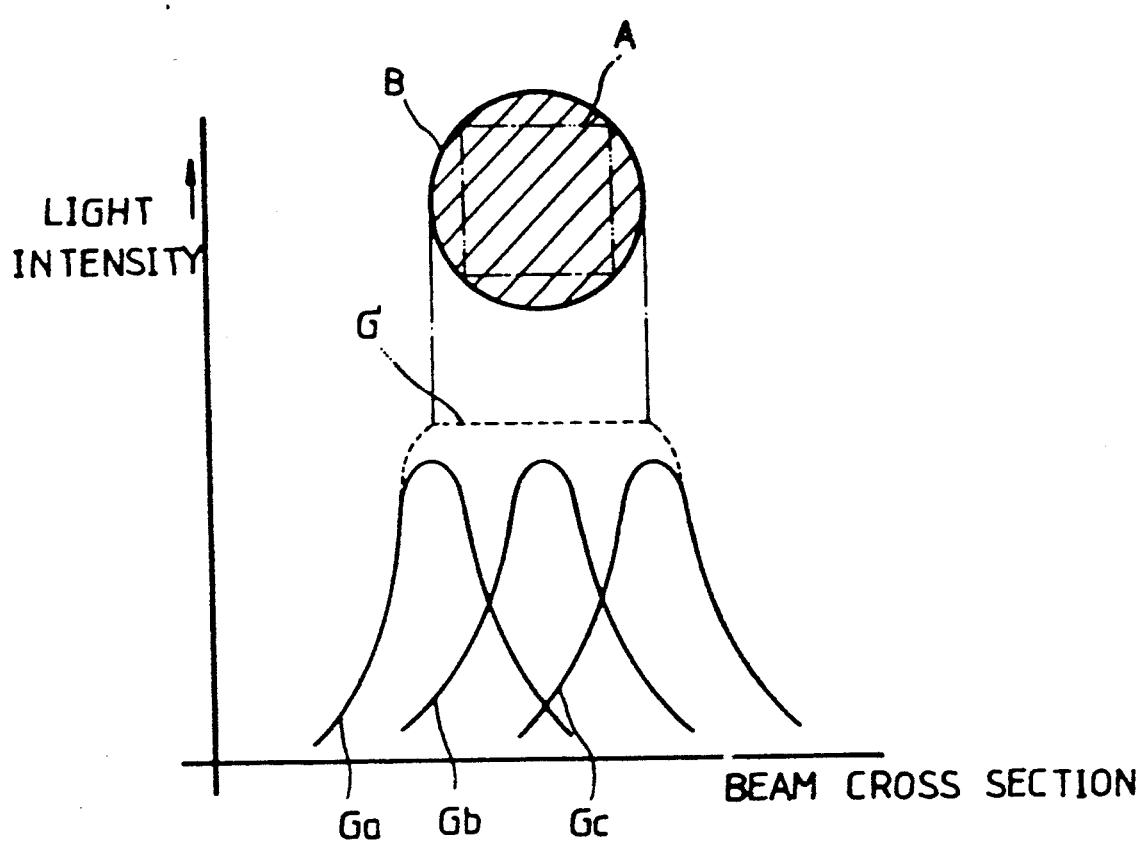
FIG. 6 is a Gaussian beam distribution chart of the embodiment shown in FIG. 4.

Referring to FIG. 6, overlapping parabolic distributions Ga, Gb and Gc of the Gaussian beam of each laser diode 11a, 11b and 11c acquire an effective Gaussian beam distribution G' having a uniform maximum value and a broad circular region B. As square region A inscribed with circular region B meets semi-cylinder lens 12, low power consumption is achieved as well as efficiency.

As described above, the present invention makes it possible to effectively erase information by means of an erasing optical device which forms a focal line and to repeatedly record information without noise, during the erasing and recording operation of an optical recording tape having a thermo-deforming layer. In addition, the present invention achieves low power consumption by the efficient use of light.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for erasing information from optical recording tape having a thermo-deforming layer in which information is recorded by forming bumps with residual stress deformed viscoelastically via heating portions of said thermo-deforming layer, and the information is erased by making said bumps planar by re-heating said bumps to remove residual stress, said method comprising the steps of:

emitting and condensing a light of predetermined energy, produced from at least one optical element, along a focal line on the optical recording tape;

re-heating the thermo-deforming layer including the bumps along the focal line with said light for erasing information along said focal line.

2. The method of claim 1, further comprising the step of:

detecting a reflected light from said focal line of said optical recording tape for calibrating one of the optical elements so that said focal line is incident with said tape.

3. The method of claim 1, wherein said optical elements comprise:

a light source; and a square aperture intercepting low-intensity peripheral light and simultaneously passing a square, central cross-section of said light to a corresponding square section of a collimating lens so that, the light passes through the collimating lens to a focussing lens which concentrates and focusses said collimated light along the focal line.

4. The method of claim 3, wherein the focussing lens is one of a cylindrical lens and a semi-cylindrical lens.

5. The method of claim 3, further comprising:

emitting said light to the square aperture from a plurality of light sources of selected intensities and selected spacings along a line parallel to the focal line; and providing a uniform maximum value of optical energy of said collimated light within a square region incident to said focussing lens, and providing even Gaussian gain distribution within the square region.

6. An apparatus for erasing information from an optical recording tape having a thermo-deforming layer in which information has been recorded by forming bumps with residual stress deformed viscoelastically by way of heating portions of said thermo-deforming layer, and said information is erased by making said bumps planar by re-heating said bumps to remove the residual stress, said erasing apparatus comprising:

a light source which produces a light having a predetermined thermal energy; and an erasing optical device comprising a lens element for condensing the light generated from said light source, and for projecting a focal line of said condensed light on said optical recording tape for erasing said information located along said focal line.

7. The apparatus of claim 6, wherein said lens element comprises one of a cylindrical lens and a semi-cylindrical lens.

8. The apparatus of claim 6, wherein said erasing optical device further comprises an optical component, located between said light source and said lens element, for converting the light generated from said light source into parallel light.

9. The apparatus of claim 8, wherein said erasing optical device further comprises a light intercepting means, located between said light source and said lens element, for selectively passing the light.

10. The apparatus of claim 9, wherein said light source comprises means for providing electromagnetic radiation emanating from a plurality of selected spaced-apart positions arranged along a length parallel to said focal line, said means for providing electromagnetic radiation generating a uniform maximum value of said electromagnetic radiation and producing an even Gaussian gain distribution within a square region incident to the lens element.

11. The apparatus of claim 8, wherein said erasing optical device further comprises a square aperture located between said optical component and the light source, said square aperture intercepting low-intensity peripheral light and simultaneously passing a square, central cross-section of said light to a corresponding square section of the optical component so that, when the converted light passing through the optical component is incident to the lens element, said lens element concentrates and focusses said converted light along the focal line on the optical recording tape.

12. The apparatus of claim 11, wherein said light source comprises means for providing electromagnetic radiation emanating from a plurality of selected spaced-apart positions arranged along a length parallel to said focal line, said means for providing electromagnetic radiation generating a uniform maximum value of said electromagnetic radiation and producing an even Gaussian gain distribution within a square region incident to the lens element.

13. The apparatus of claim 8, wherein said light source comprises means for providing electromagnetic radiation emanating from a plurality of selected spaced-apart positions arranged along a length parallel to said focal line, said means for providing electromagnetic radiation generating a uniform maximum value of said electromagnetic radiation and producing an even Gaussian gain distribution within a square region incident to the lens element.

14. The apparatus of claim 6, wherein said erasing optical device further comprises a light intercepting means, located between said light source and said lens element, for selectively passing the light.

15. The apparatus of claim 14, wherein said light source comprises means for providing electromagnetic radiation emanating from a plurality of selected spaced-apart positions arranged along a length parallel to said focal line, said means for providing electromagnetic radiation generating a uniform maximum value of said electromagnetic radiation and producing an even Gaussian gain distribution within a square region incident to the lens element.

16. The apparatus of claim 6, wherein said light source comprises means for providing electromagnetic radiation of selected intensity emanating from a plurality of selected spaced-apart positions arranged along a length parallel to said focal line, said means for providing electromagnetic radiation generating a uniform maximum value of said electromagnetic radiation and producing an even Gaussian gain distribution within a square region incident to the lens element.

* * * * *